United States Patent
Sikka et al.

(10) Patent No.: US 9,262,689 B1
(45) Date of Patent: Feb. 16, 2016

(54) OPTIMIZING PRE-PROCESSING TIMES FOR FASTER RESPONSE

(71) Applicant: Amazon Technologies, Inc., Reno, NV (US)

(72) Inventors: Avnish Sikka, Acton, MA (US); David Paul Ramos, Cambridge, MA (US); Matthew Daniel Hart, Cambridge, MA (US); Yue Liu, Brighton, MA (US); Emilie Noelle McConville, Boston, MA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 128 days.

(21) Appl. No.: 14/133,347

(22) Filed: Dec. 18, 2013

(51) Int. Cl.
*G06K 9/00* (2006.01)
*G06K 9/46* (2006.01)
*G06K 9/34* (2006.01)

(52) U.S. Cl.
CPC .............. *G06K 9/4642* (2013.01); *G06K 9/34* (2013.01)

(58) Field of Classification Search
USPC ........................................................ 382/164
See application file for complete search history.

(56) References Cited

U.S. PATENT DOCUMENTS

| | | | |
|---|---|---|---|
| 9,043,349 B1* | 5/2015 | Lin et al. | 707/758 |
| 2010/0046842 A1* | 2/2010 | Conwell | 382/218 |
| 2011/0238676 A1* | 9/2011 | Liu et al. | 707/752 |
| 2011/0285874 A1* | 11/2011 | Showering et al. | 348/231.99 |
| 2013/0205202 A1* | 8/2013 | Xiao et al. | 715/249 |
| 2014/0111542 A1* | 4/2014 | Wan | 345/633 |
| 2014/0161365 A1* | 6/2014 | Acharya et al. | 382/229 |

* cited by examiner

*Primary Examiner* — Yon Couso
(74) *Attorney, Agent, or Firm* — Seyfarth Shaw LLP; Ilan N. Barzilay

(57) ABSTRACT

Embodiments of the subject technology provide for determining a region of a first acquired image based at least on a viewing mode and a set of respective positions of graphical elements to decrease the pre-processing time and perceived latency for the first image. One or more regions of text in the first image are detected, and a set of regions of text that overlap with the region of the image is determined and pre-processed. The subject technology may then pre-process an entirety of a subsequent image (e.g., to pick up missing text from the region of the first image). Thus, additional OCR results may be provided to the user by using the subsequent image(s) and merging subsequent results with previous results from the first image.

20 Claims, 8 Drawing Sheets

OPTIMIZING PRE-PROCESSING TIMES FOR FASTER RESPONSE

BACKGROUND

In computing, a recognition process may be provided for recognizing patterns or types of objects in input data, such as image data. One type of such a recognition process includes optical character recognition (OCR) that may be utilized to identify one or more characters of text in a given image.

With the introduction of more powerful and capable mobile computing devices (e.g., smartphones, phablets, tablet computing devices, etc.), applications that were traditionally found on desktop computing devices or servers are being implemented for running on mobile computing devices. For a given OCR implementation adapted for use on a mobile computing device, a set of challenges are presented as mobile computing devices are used in different physical environments and have a more limited set of resources that may require a more efficient OCR implementation to optimally run on a given mobile computing device.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the subject technology may overcome one or more deficiencies experienced in existing approaches to providing a recognition process related to different applications including computer vision, objection recognition, or optical character recognition (OCR) in a mobile computing device.

The subject technology provides approaches to performing one or more recognition processes, such as OCR, using a mobile computing device, which can provide advantages such as reduced latency and/or resource consumption. In some examples, a mobile computing device may perform a set of pre-processing operations to prepare a given image for OCR. One factor that increases a latency of performing OCR relates to a size of the image. For instance, as the size of the image increases (e.g., more data), a latency for processing the image may increase. Thus, in some embodiments, the subject technology improves latency by providing techniques for more efficiently performing pre-processing operations by only performing such operations on portions of the image without significantly impacting the accuracy of OCR that is subsequently performed on the image.

In some cases, a user will most likely move a given mobile computing device to capture text to identify in, or near, a central region of a display screen of the mobile computing device. Further, the user is likely not to hide the text behind graphical elements included in a given user interface or include text that may be close to a border region of the display screen. Additionally, portions of an image around the border region of the display screen may contain noise or artifacts that may be difficult to pre-process and increase false positives for detecting text. In some embodiments, the subject technology excludes the border regions of a first image to decrease the pre-processing time and perceived latency for the first image and then pre-process an entirety of a subsequent image (e.g., to pick up missing text from the excluded regions of the first image). In this fashion, additional OCR results may be provided to the user by using the subsequent image(s) and merging the subsequent OCR results with previous OCR results from the first image.

Figure 1A:
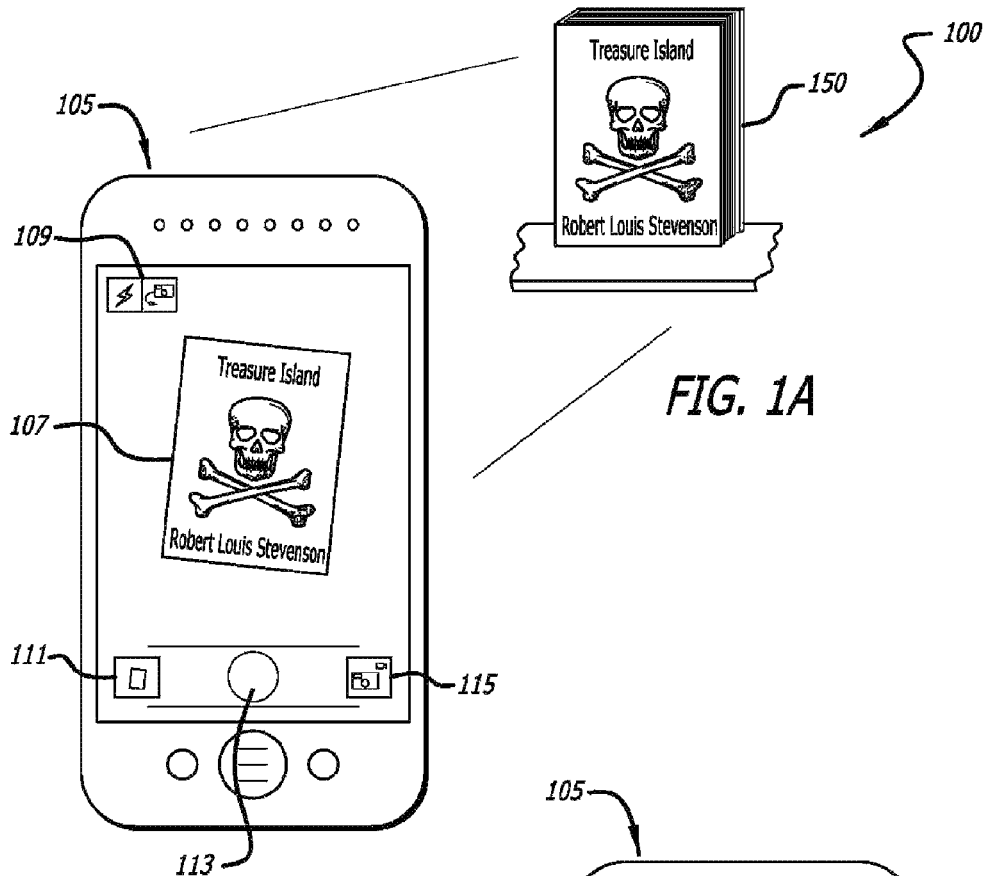
FIG. 1A conceptually illustrates a first stage of an example of using a bounding region of an image in a portrait viewing mode to decrease a latency of performing pre-processing for a given recognition process.

FIG. 1A conceptually illustrates a first stage 100 of an example of using a bounding region of an image in a portrait viewing mode to decrease a latency of performing pre-processing for a given recognition process (e.g., optical character recognition (OCR)). As shown, a mobile computing device 105 may be used for capturing one or more images for OCR.

Although a mobile computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

As shown in FIG. 1A, a camera of the mobile computing device 105 captures an image 107 of an object 150 (e.g., a book). In this example, the image 107 has a size that matches a display resolution (e.g., as measured in a height and width of pixels) of a given display screen of the mobile computing device. The image 107 includes text corresponding to the object 150 (e.g., title and author of the book) that a user wishes to perform OCR on. In some embodiments, the mobile computing device 105 performs a set of operations to decrease latency of pre-processing operations that prepare the image 107 for OCR. More specifically, the mobile computing device determines a region of the image 107 to reduce an amount of image data that is pre-processed in preparation for a recognition process such as OCR. In this example, it is assumed that a predominantly center portion of a display screen of the mobile computing device 105 includes a portion of the image 107 that a user wishes to perform OCR on.

Initially, the mobile computing device 105 determines a viewing mode of the mobile computing device 105 in some embodiments. For instance, the viewing mode of the mobile computing device 105 is a portrait mode as illustrated in FIG. 1A. As further shown in FIG. 1A, a set of graphical elements 109, 111, 113 and 115 are provided (e.g., as opaque, semi-transparent or transparent elements) as part of a user interface of an application. Since the size of the image 107 matches the display resolution of the screen, the set of graphical elements 109, 111, 113 and 115 therefore covers portions of the image 107. It is appreciated that more or less graphical elements than shown in the example of FIG. 1A may be provided in the user interface and still be within the scope of the subject technology.

The mobile computing device 105 may determine a set of respective positions of the set of graphical elements 109, 111, 113 and 115. In some embodiments, a region of the image 107 that is predominantly in the center portion of the screen of the mobile computing device 105 may be determined based at least on the viewing mode and the set of respective positions of the set of graphical elements as discussed further below.

Figure 1B:
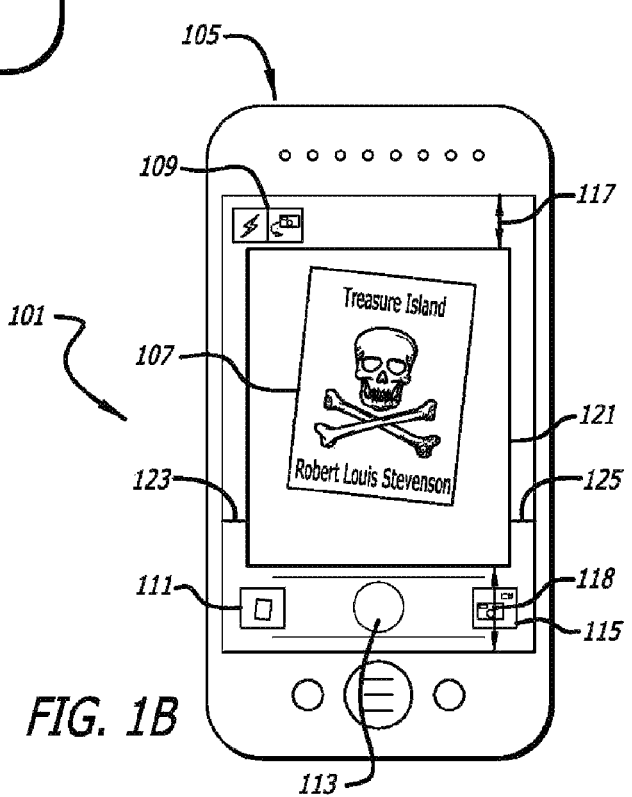
FIG. 1B conceptually illustrates a second stage of an example of using a bounding region of an image in a portrait viewing mode to decrease a latency of performing pre-processing for a given recognition process.

FIG. 1B conceptually illustrates a second stage 101 of an example of using a bounding region of an image in a portrait viewing mode to decrease a latency of performing pre-processing for a given recognition process (e.g., OCR). More specifically, the second stage 101 illustrates a subsequent stage that occurs after the stage 100 illustrated in FIG. 1A.

As illustrated in the example of FIG. 1B, the mobile computing device 105 determines a region 121 of the image 107 based at least on the viewing mode and the set of respective positions of the set of graphical elements 109, 111, 113 and 115. As mentioned before, the size of the image 107 matches the display resolution of the display screen of the mobile computing device. The image 107, in this example, may have a height of 1280 pixels. In this example, the region 121 of the image may exclude a top portion of the image 107 by a distance 117 of 12.5% of the height of the image 107 and a bottom portion of the image 107 by a distance 118 of 22.5% of the height of the image 107. The distances 117 and 118 may be determined based on the respective set of positions for each graphical element from among the set of graphical elements 109, 111, 113 and 115. For instance, when in the portrait viewing mode, the mobile computing device 105 may exclude respective portions of the image 107 based on the distances 117 and 118 that overlap or are covered by the set of graphical elements 109, 111, 113 and 115 so that the graphical elements no longer overlap the region of the image 107 that will be selected for pre-processing. As further shown, the mobile computing device 105 may further exclude a left portion of the image 107 by a distance 123 and exclude a right portion of the image 107 by a distance 125 of the image 107. When the mobile computing device 105 is in a portrait viewing mode, the distance 123 and the distance 125 may each be less than the distances 117 and 118 that are used to respectively exclude the top and bottom portions of the image 107. However, it is appreciated that the distances 123 and 125 may each be greater than the distances 117 and 118 in some embodiments.

The mobile computing device 105 may then perform pre-processing on the region 121, which represents a region of the image 107 that is predominantly in the center of the screen of the mobile computing device 105. Thus, an amount of image data that is pre-processed is reduced by selecting a region of the image 107 based on the distances 117, 118, 123 and 125. It is appreciated that other amount or percentages of distances as discussed above may be used and still be within the scope of the subject technology.

The aforementioned pre-processing may include operations such as, but not limited to, detecting a set of glyphs in the image, removing one or more non-text features in the image, and performing binarization of the image by changing the image to only include black and white colors. In general, pre-processing may include one or more operations that prepare a given image in order to make more efficient or increase a likelihood of success of a recognition process (e.g., optical character recognition) that is applied to the image. It is appreciated that other types of pre-processing operations may be performed by the mobile computing device and still be within the scope of the subject technology.

Figure 2A:
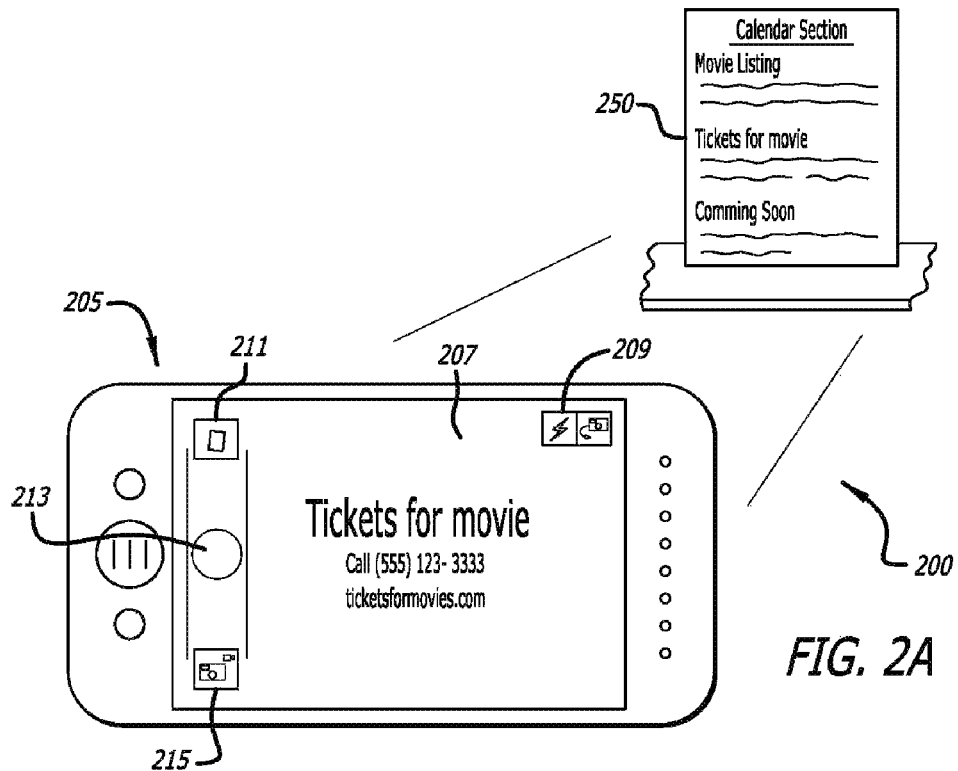
FIG. 2A conceptually illustrates a first stage of an example of using a bounding region of an image in a landscape viewing mode to decrease a latency of performing pre-processing for a given recognition process.

FIG. 2A conceptually illustrates a first stage 200 of an example of using a bounding region of an image in a landscape viewing mode to decrease a latency of performing pre-processing for a given recognition process (e.g., OCR). More specifically, FIG. 2A illustrates a different example than the previous examples shown in FIGS. 1A-1B in which an image corresponding to an object with a different set of text (e.g., with more characters of varying sizes) undergoes pre-processing for OCR while in a landscape viewing mode of the mobile computing device 205.

As shown in FIG. 2A, a camera of the mobile computing device 205 captures an image 207 of an object 250. The image 207 has a size that matches a display resolution (e.g., as measured in a height and width of pixels) of a display screen of the mobile computing device 205. As further shown, the image 207 includes a set of characters (e.g., "Tickets for movie", "Call (555) 123-3333" and "ticketsformovies.com"). Similar to the examples described in FIGS. 1A-1B, the mobile computing device 205 determines a region of the image 207 to reduce an amount of image data that is pre-processed in preparation for OCR. In this example, it is also assumed that a center portion of a display screen of the mobile computing device 205 includes a portion of the image 207 that a user wishes to perform OCR on.

The mobile computing device 205 determines a viewing mode of the mobile computing device 205 in some embodiments. For instance, the viewing mode of the mobile computing device 205 is a landscape mode as illustrated in FIG. 2A. As further shown in FIG. 2A, a set of graphical elements 209, 211, 213 and 215 are provided (e.g., as opaque, semi-transparent or transparent elements) as part of a user interface of an application. Since the size of the image 207 matches the display resolution of the screen, the set of graphical elements 209, 211, 213 and 215 covers portions of the image 207. It is appreciated that more or less graphical elements than shown in the example of FIG. 2A may be provided in the user interface and still be within the scope of the subject technology.

The mobile computing device 205 may determine a set of respective positions of the set of graphical elements 209, 211, 213 and 215. A region of the image 207, which is predominantly in the center portion of the screen of the mobile computing device 205, may be determined based at least on the viewing mode and the set of respective positions of the set of graphical elements as described further below.

Figure 2B:
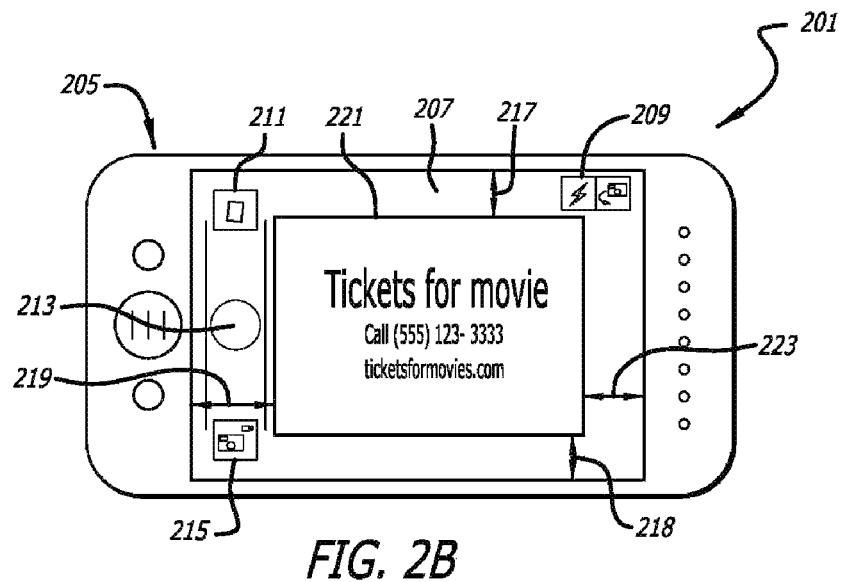
FIG. 2B conceptually illustrates a second stage of an example of using a bounding region of an image in a portrait viewing mode to decrease a latency of performing pre-processing for a given recognition process.

FIG. 2B conceptually illustrates a second stage 201 of an example of using a bounding region of an image in a portrait viewing mode to decrease a latency of performing pre-processing for a given recognition process (e.g., OCR). More specifically, the second stage 201 illustrates a subsequent stage that occurs after the stage 200 illustrated in FIG. 2A.

As illustrated in the example of FIG. 2B, the mobile computing device 205 determines a region 221 of the image 207 based at least on the viewing mode and the set of respective positions of the set of graphical elements 209, 211, 213 and 215. As mentioned before, the size of the image 207 matches the display resolution of the display screen of the mobile computing device. In this example when the mobile computing device 205 is in the landscape viewing mode, the image 207 may have height of 720 pixels and a width of 1280 pixels. The mobile computing device 205 excludes a top portion of the image 207 by a distance 217 of 12.5% of the height of the image 207 and a bottom portion of the image 207 by a distance 218 of 15% of the height of the image 207. Further, the mobile computing device excludes a left portion of the image 207 by a distance 219 of 10% of the width of the image 207, and excludes a right portion of the image 207 by a distance 223 of 8% of the width of the image 207 in this example. Thus, an amount of image data that is pre-processed is reduced by selecting a portion of the image 207 based on the region 221 using the distances 217, 218, 219 and 223. When the mobile computing device 205 is in a landscape viewing mode as shown in FIG. 2B, the region of the image 207 may exclude more from a top and bottom border of the image 207 than from a right and left border of the image 207.

In the example of FIG. 2B, the distances 217, 219 and 223 may also be determined based on the respective set of positions for each graphical element from among the set of graphical elements 209, 211, 213 and 215. For instance, the mobile computing device 205 may exclude respective portions of the image 207 that overlap or are covered by the set of graphical elements 209, 211, 213 and 215 based on the distances 217, 219 and 223 so that the graphical elements no longer overlap the portion of the image selected for pre-processing.

Figure 3A:
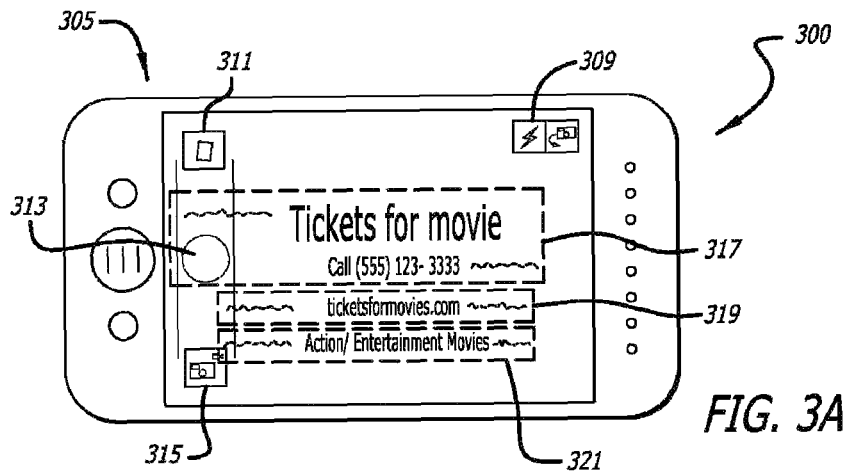
FIG. 3A conceptually illustrates a first stage of an example of detecting text regions for using in conjunction with a bounding region in a landscape viewing mode to decrease a latency of performing pre-processing for a given recognition process.

FIG. 3A conceptually illustrates a first stage 300 of an example of detecting text regions for using in conjunction with a bounding region in a landscape viewing mode to decrease a latency of performing pre-processing for a given recognition process (e.g., OCR). More specifically, FIG. 3A illustrates a first stage of an example in which text detection is performed to determine a set of potential text regions in a given image, and based on the detected potential text regions, utilizing a bounding region for selecting and adjusting the potential text regions for pre-processing. In this manner, an amount of image data to be processed is reduced and, as a result, a latency for pre-processing (and subsequently performing OCR on) a given image may be decreased.

As shown in FIG. 3A, a mobile computing device 305 captures an image that includes a set of text regions. In some embodiments, the mobile computing device 305 performs a text detection algorithm or technique that detects a set of potential text regions in a given image. For instance, the mobile computing device 305 detects a set of text regions 317, 319 and 321 as illustrated in FIG. 3A. In some examples, the text detection algorithm is a "faster" algorithm for detecting that there is potentially text in the image without determining whether text is actually present in the image. By way of example, such a text detection algorithm uses a more lenient form of detection that looks for image characteristics or patterns that appear to be glyphs but does not perform an operation(s) to confirm that the characteristics or patterns are, in fact, glyphs. It is understood that a number of false positives for detected text may increase with such a text detection algorithm.

As further illustrated in the example of FIG. 3A, a set of graphical elements 309, 311, 313 and 315 are included in a user interface provided for display by the mobile computing device 305. As discussed in further detail below, the mobile computing device 305 may take into account respective positions of aforementioned set of graphical elements to determine a bounding region of the image as discussed further below.

Figure 3B:
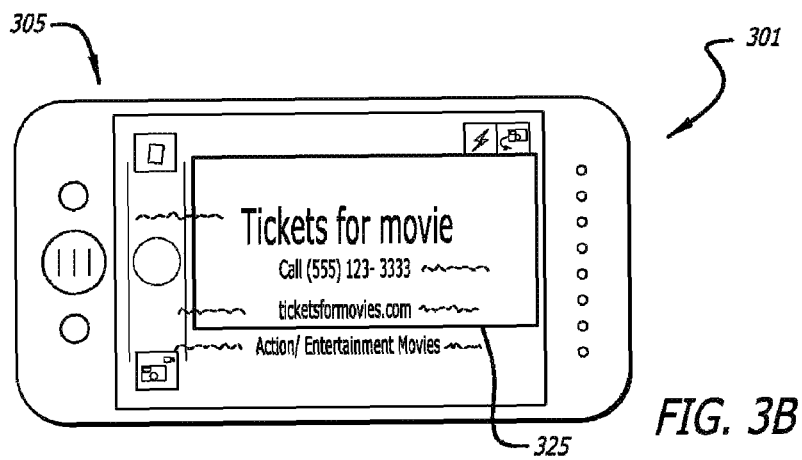
FIG. 3B conceptually illustrates a second stage of an example of using detected text regions in conjunction with a bounding region in a landscape viewing mode to decrease a latency of performing pre-processing for a given recognition process.

FIG. 3B conceptually illustrates a second stage 301 of an example of using detected text regions in conjunction with a bounding region in a landscape viewing mode to decrease a latency of performing pre-processing for a given recognition process (e.g., OCR). More specifically, FIG. 3B illustrates a second stage of an example that occurs after the stage 300 in FIG. 3A in which a bounding region is determined for selecting and adjusting previously detected potential text regions for pre-processing before OCR is performed. In some embodiments, the operations described in FIGS. 3A and 3B may be performed conjunctively. In the description below, portions of FIG. 3B will be described by referencing FIG. 3A.

As illustrated in the example of FIG. 3B, the mobile computing device 305 determines a region 325 of the image based at least on the viewing mode and, by reference to FIG. 3A, the set of respective positions of the set of graphical elements 309, 311, 313 and 315. When in the landscape viewing mode, the region 325 may exclude more from a top and bottom border of the image than from a right and left border of the image. Further, the mobile computing device 305 may determine that the image overlaps or is covered by the set of graphical elements 311, 313 and 315 and select the region 325 of the image to exclude the set of graphical elements 311, 313 and 315. The mobile computing device may then use the region 325 in conjunction with the detected text regions 317, 319 and 321 to select one or more text regions that overlap the region 325. In this example, the mobile computing device 305 selects the text regions 317 and 319 in FIG. 3A since these text regions overlap the region 325.

Figure 3C:
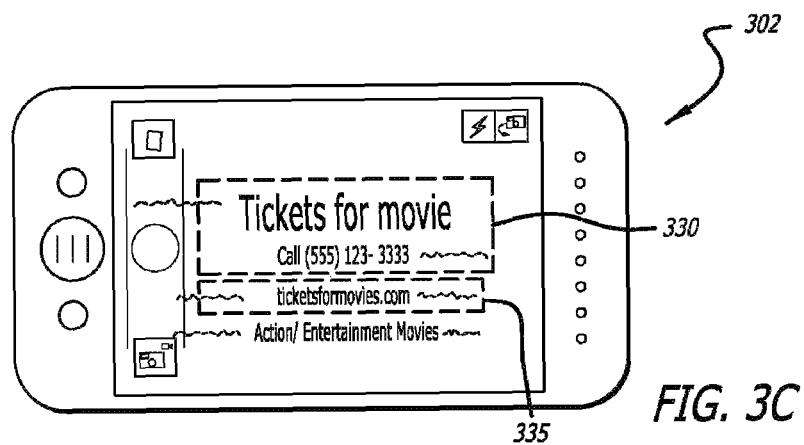
FIG. 3C conceptually illustrates a third stage of an example of adjusting text regions in conjunction with a bounding region in a landscape viewing mode to decrease a latency of pre-processing for a given recognition process.

FIG. 3C conceptually illustrates a third stage 302 of an example of adjusting text regions in conjunction with a bounding region in a landscape viewing mode to decrease a latency of pre-processing for a given recognition process (e.g., OCR). More specifically, FIG. 3C illustrates a third stage of an example that occurs after the stages 300 and 301 from FIGS. 3A and 3B in which selected text regions are adjusted to be within a set of boundaries for a given bounding region (e.g., as shown in FIG. 3B). In the description below, portions of FIG. 3C will be described by referencing FIGS. 3A and 3B.

As illustrated in the example of FIG. 3C, the mobile computing device 305 has adjusted respective boundaries of the selected text regions 317 and 319 in FIG. 3A to fit within the boundaries of the region 325 in FIG. 3B. As shown, adjusted text regions 330 and 335 correspond, respectively, to the text regions 317 and 319 in FIG. 3A. In order to fit within the region 325, the adjusted text regions 330 and 335 each have a smaller width than the corresponding selected text regions 317 and 319. The mobile computing device 305 may then perform pre-processing for OCR on the adjusted text regions 330 and 335. In some instances, however, if no overlapping text regions are detected based on the region 325 (e.g., when text may be outside of the region 325), the entirety of the image may undergo pre-processing.

Although the examples of FIGS. 3A-3C discuss determining a bounding region and selecting and adjusting one or more detected text regions when the mobile computing device 305 is in the landscape viewing mode, it is appreciated that a mobile computing device may perform similar operations when the mobile computing device is in a portrait viewing mode. For instance, while in a portrait viewing mode, the mobile computing device may determine a bounding region similar to the examples described in FIGS. 1A and 1B and subsequently detect, select and adjust respective text regions in a similar fashion to the description in FIGS. 3A and 3C.

Figure 4A:
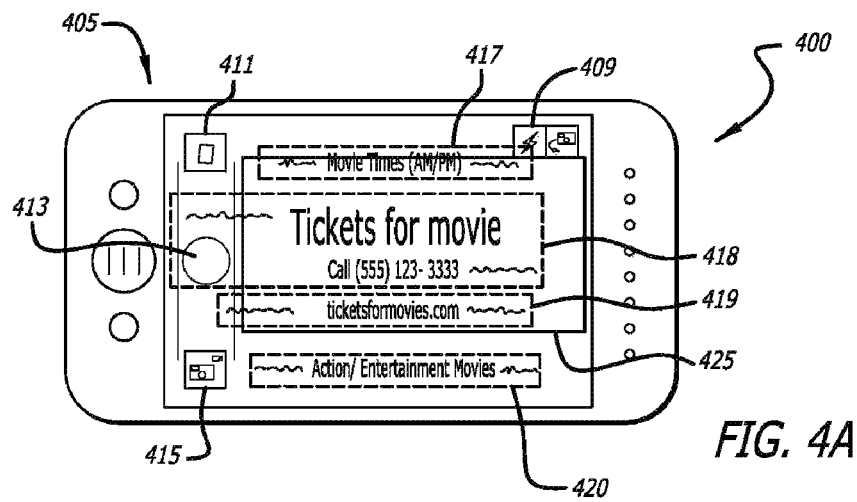
FIG. 4A conceptually illustrates a first stage of an example of detecting text regions for using in conjunction with a bounding region in a landscape viewing mode to decrease a latency of performing pre-processing for a given recognition process.

FIG. 4A conceptually illustrates a first stage 400 of an example of detecting text regions for using in conjunction with a bounding region in a landscape viewing mode to decrease a latency of performing pre-processing for a given recognition process (e.g., OCR). More specifically, FIG. 4A illustrates a first stage of an example in which text detection is performed to determine a set of potential text regions in a given image, and then determining a bounding region for selecting a subset of the potential text regions for pre-processing. In this manner, an amount of image data to be processed is reduced and, as a result, a latency for pre-processing (and subsequently performing OCR on) a given image may be decreased.

As shown in FIG. 4A, a mobile computing device 405 captures an image that includes a set of text regions. In some embodiments, the mobile computing device 405 performs a text detection algorithm or technique that detects a set of potential text regions in a given image. For instance, the mobile computing device 405 detects a set of text regions 417, 418, 419 and 420 as illustrated in FIG. 4A. As mentioned before, the text detection algorithm may be a "faster" algorithm that applies a more lenient form of detection which looks for image characteristics or patterns that appear to be glyphs but does not perform an operation(s) to confirm that the characteristics or patterns are, in fact, glyphs.

As further illustrated in the example of FIG. 4A, a set of graphical elements 409, 411, 413 and 415 are included in a user interface provided for display by the mobile computing device 405. As discussed in further detail below, the mobile computing device 405 may take into account respective positions of aforementioned set of graphical elements to determine a bounding region for selecting a set of text regions.

In some embodiments, the mobile computing device 405 determines a region 425 (e.g., similar to the examples of FIGS. 2A and 2B) of the image based at least on the viewing mode and, by reference to FIG. 4A, the set of respective positions of the set of graphical elements 409, 411, 413 and 415. When in the landscape viewing mode, the region 425 may exclude more from a top and bottom border of the image than from a right and left border of the image. The mobile computing device 405 may determine the region 425 that excludes respective portions of the image that overlap or are covered by the set of graphical elements 409, 411, 413 and 415.

Figure 4B:
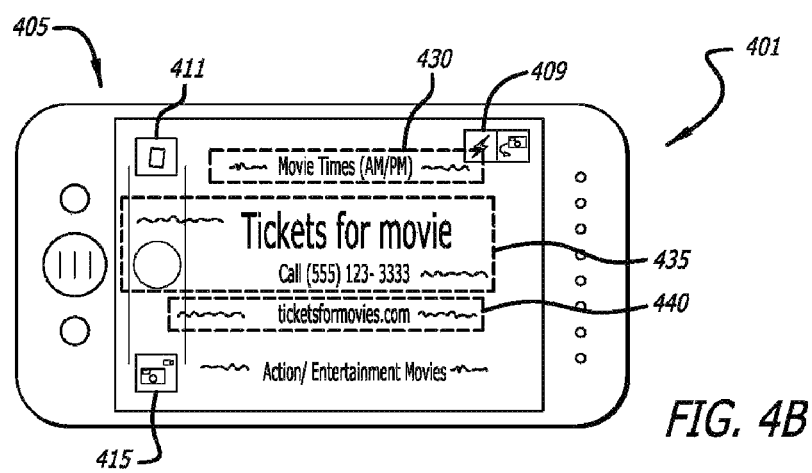
FIG. 4B conceptually illustrates a second stage of an example of using a bounding region for selecting text regions in a landscape viewing mode to decrease a latency of performing pre-processing for a given recognition process.

FIG. 4B conceptually illustrates a second stage 401 of an example of using a bounding region for selecting text regions in a landscape viewing mode to decrease a latency of performing pre-processing for a given recognition process (e.g., OCR). More specifically, FIG. 4B illustrates a second stage of an example that occurs after the stage 401 in FIG. 4A in which in a bounding region is utilized for selecting a subset of previously detected text regions for pre-processing. In this manner, an amount of image data to be processed is reduced and, as a result, a latency for pre-processing (and subsequently performing OCR on) a given image may be decreased. In the description below, portions of FIG. 4B will be described by referencing FIG. 4A.

The mobile computing device 405 may then use the region 425 in FIG. 4A in conjunction with the detected text regions 417, 418, 419 and 420 to select one or more text regions that overlap the region 425. In this example, the mobile computing device 405 selects the text regions 417, 418 and 419 in FIG. 4A since these text regions overlap the region 425. Further, the mobile computing device 405 does not select the text region 420 in FIG. 4A as this text region does not overlap the region 425 corresponding to the bounding region for selecting text regions. The selected text regions are illustrated as respective text regions 430, 435 and 440 in FIG. 4B. In some instances, however, if no overlapping text regions are detected based on the region 425, the entire image may undergo pre-processing.

Although the examples of FIGS. 4A and 4B discuss determining a bounding region and selecting one or more detected text regions when the mobile computing device 405 is in the landscape viewing mode, it is appreciated that a mobile computing device may perform similar operations when the mobile computing device is in a portrait viewing mode. For instance, while in a portrait viewing mode, the mobile computing device may determine a bounding region similar to the examples described in FIGS. 1A and 1B and subsequently detect and select respective text regions in a similar fashion to the description in FIGS. 4A and 4B.

Figure 5:
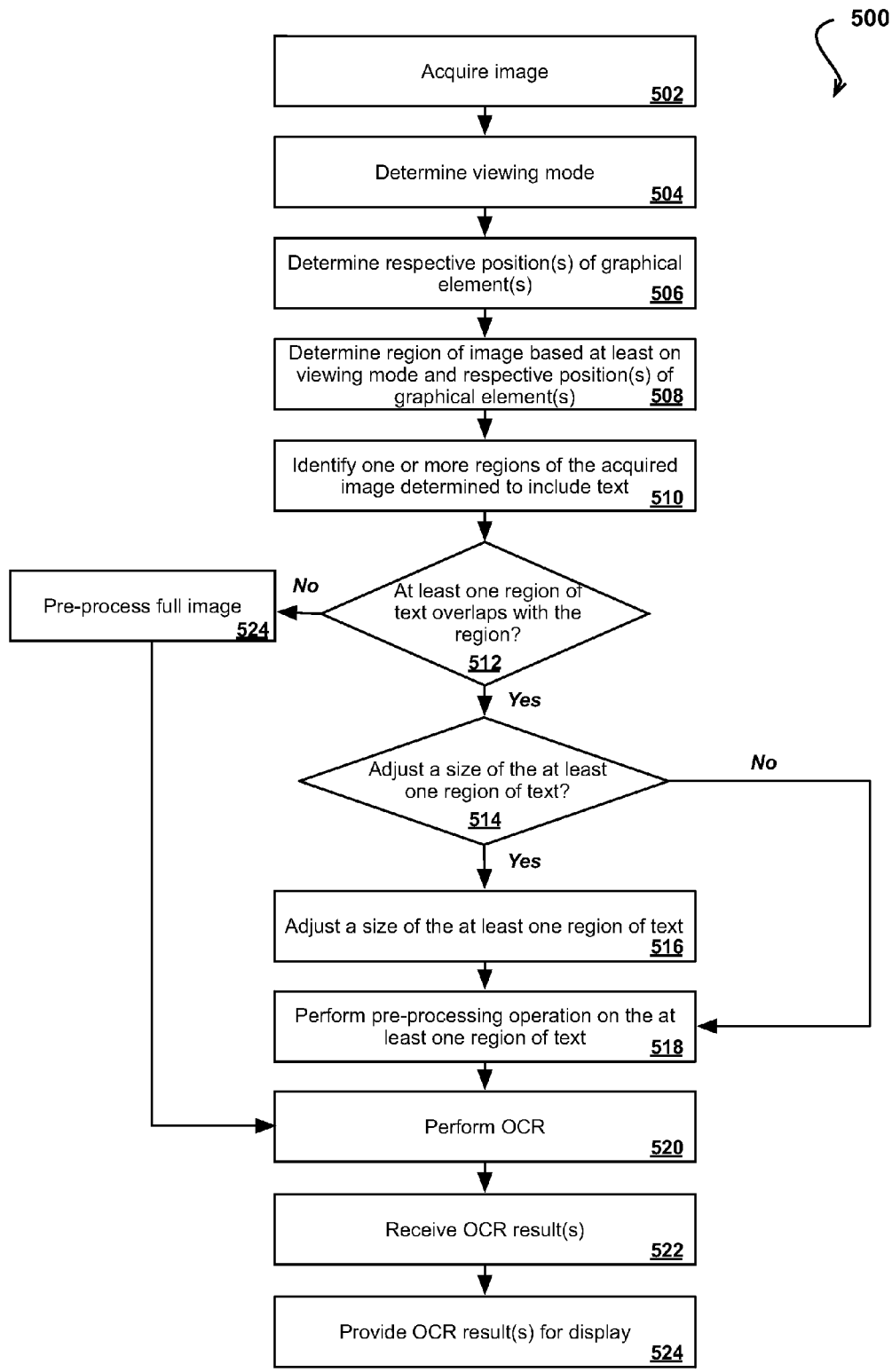
FIG. 5 illustrates steps of an example process for optimizing pre-processing of an image on a mobile computing device by using a bounding region of the image in conjunction with a set of detected text regions in accordance with some embodiments of the subject technology.

FIG. 5 illustrates steps of an example process 500 for optimizing pre-processing of an image on a mobile computing device by using a bounding region of the image in conjunction with a set of detected text regions in accordance with some embodiments of the subject technology. In some embodiments, the process 500 may be implemented by one or more computing devices or systems (e.g., a mobile computing device). More specifically, for improving the latency in which one or more OCR results are provided to a user, the process 500 illustrates an example implementation of reducing latency in pre-processing a given image by only performing pre-processing operations on a portion of the image. It should be appreciated that for any process described herein, there can be additional, fewer, or alternative steps performed in similar or alternative orders, or in parallel and still be within the scope of the subject technology.

At step 502, an image from a camera of a mobile computing device is acquired at the mobile computing device. In some embodiments, the acquired image may be an initial image in a multi-image session for the mobile computing device in which multiple images are captured in succession (e.g., captured no greater than a predetermined period of time apart such as 500 ms).

At step 504, a viewing mode of the mobile computing device is determined. In some examples, the viewing mode may be a portrait mode or landscape mode based on an orientation of the mobile computing device when the image was acquired.

At step 506, a set of respective positions of a set of graphical elements in a user interface provided for display by the mobile computing device is determined. For instance, the set of graphical elements, when the mobile computing device displays the acquired image, may be at respective positions near one or more respective borders of the acquired image and may overlap such portions of the acquired image. However, it is appreciated that such graphical elements may be included in other positions in the user interface (e.g., center).

At step 508, a region of the acquired image (e.g., an image region) is determined based at least on the viewing mode and the set of respective positions of the set of graphical elements. For instance, the region of the acquired image may be a portion of a size of the acquired image, or may be predominantly a center portion of the acquired image. By way of example, the center portion of the acquired image is defined based at least in part on a set of distances away from at least one of a top border, bottom border, left border or right border of the acquired image. When the mobile computing device is in a portrait viewing mode, the top and/or bottom borders of the image may be more excluded than the right and/or left borders of the image based on the determined region. In contrast, when the mobile computing device is in a landscape viewing mode, the left and/or right borders of the image may be more excluded than the top and/or bottom borders of the image based on the determined region of the image. Further, a portion(s) of the image may be excluded so that any graphical elements included in the user interface do not overlap the selected region (e.g., as illustrated in the examples of FIGS. 1B, 2B, 3B and 4A).

In some additional embodiments, a language of text included in the image may be detected by the mobile computing device to further influence how the selected region of the acquired image is determined. For example, Asian languages such as Chinese, Japanese and Korean may include characters that are displayed vertically (e.g., top to bottom) instead of horizontally (e.g., left to right) in Western languages such as English, French, German, etc.). In such instances where an Asian language is detected, the mobile computing device may further increase respective distances from the right and/or left borders of the image for determining the selected region of the image. The language may be detected, in some examples, by checking for a language setting of the mobile computing device, or by running an algorithm to detect the presence of a set of lines or patterns that could represent characters from any of the aforementioned Asian languages.

At step 510, one or more regions of the acquired image determined to include text are identified based on a text detection algorithm. As mentioned before, the text detection algorithm in some examples is a "faster" algorithm for detecting that there is potentially text in the image without determining whether text is actually present in the image. By way of example, such a text detection algorithm uses a more lenient form of detection that looks for image characteristics or patterns that appear to be glyphs but does not perform an operation(s) to confirm that the characteristics or patterns are, in fact, glyphs. It is understood that a number of false positives for detected text may increase with such a text detection algorithm.

At step 512, it is determined whether at least one region of text at least partially overlaps with the region of the acquired image. Responsive to determining that at least one region of text at least partially overlaps with the region of the acquired image, in some embodiments, at step 514 it is determined whether a size of the at least one region of text should be adjusted to fit within the region. If so, at step 516, the size of the at least one region of text is adjusted to fit within the region (e.g., as shown in the example of FIG. 3C). By way of example, adjusting the at least one region of text may be accomplished by resizing the size of the at least one region of text to match a height or width of a size of the region of the acquired image. Alternatively, when the at least one region of text is not to be adjusted as determined at step 514, step 516 may be skipped, and the at least one region of text may be pre-processed at step 518 described further below.

In some instances, responsive to determining that none of the identified regions of text overlap with the region of the acquired image at step 512, an entirety of the acquired image (e.g., the full image) may undergo one or more pre-processing operations at step 524 for preparing the image for a recognition process such as OCR. As discussed before, examples of such pre-processing operations may include, but are not limited to, detecting a set of glyphs in the image, removing one or more non-text features in the image, and performing binarization of the image by changing the image to only include black and white colors. It is appreciated that other types of pre-processing operations may be performed by the mobile computing device and still be within the scope of the subject technology. In instances where none of the identified regions of text overlap with the region, a respective region(s) of text may be outside of the region of the acquired image. From step 524, OCR may be performed on the full image at step 520 and the subsequent steps 522 and 524 performed in a similar manner as described in further detail below.

At step 518 from step 514 or 516 described above, a set of pre-processing operations is performed on the at least one region of text that at least partially overlaps with the region. The set of pre-processing operations may include any of the aforementioned operations described above (e.g., detecting a set of glyphs in the image, removing one or more non-text features in the image, and performing binarization of the image by changing the image to only include black and white colors). It is appreciated that other types of pre-processing operations may be performed by the mobile computing device and still be within the scope of the subject technology.

At step 520, after the pre-processing operations are performed, a recognition process such as OCR may be performed on the at least one region of text that at least partially overlaps with the region, or on the adjusted at least one region of text that at least partially overlaps with the region (e.g., when step 516 is performed). In one example, the OCR recognizes a set of glyphs (e.g., that may have been detected from one or more pre-processing operations) from the at least one region of text to provide a respective set of characters for the at least one region of text. It is appreciated that different techniques for performing OCR may be implemented and still be within the scope of the subject technology. Also, it is appreciated that the OCR may be performed remotely (e.g., at a server) or locally at the mobile computing device.

At step 522, a set of OCR results may be received from the OCR performed on the at least one region of text that at least partially overlaps with the region of the acquired image. In some examples, each of the OCR results may include different content including text or a string corresponding to characters that are recognized from the OCR performed. It is appreciated that other type of content (e.g., image, audio, video, etc.) may be included in a respective OCR result and still be within the scope of the subject technology. At step 524, the set of OCR results are provided for display on the mobile computing device.

As mentioned before, although a mobile computing device (e.g., a smartphone, an electronic book reader, or tablet computer) is described in FIG. 5, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

The example process 500 may be implemented to provide OCR results for a single image. However, in some instances, a user may capture multiple images over a span of time (e.g., three images captured no more than 500 ms apart). Thus, multiple sets of OCR results may be merged and provided for display to the user as described in further detail below.

Figure 6:
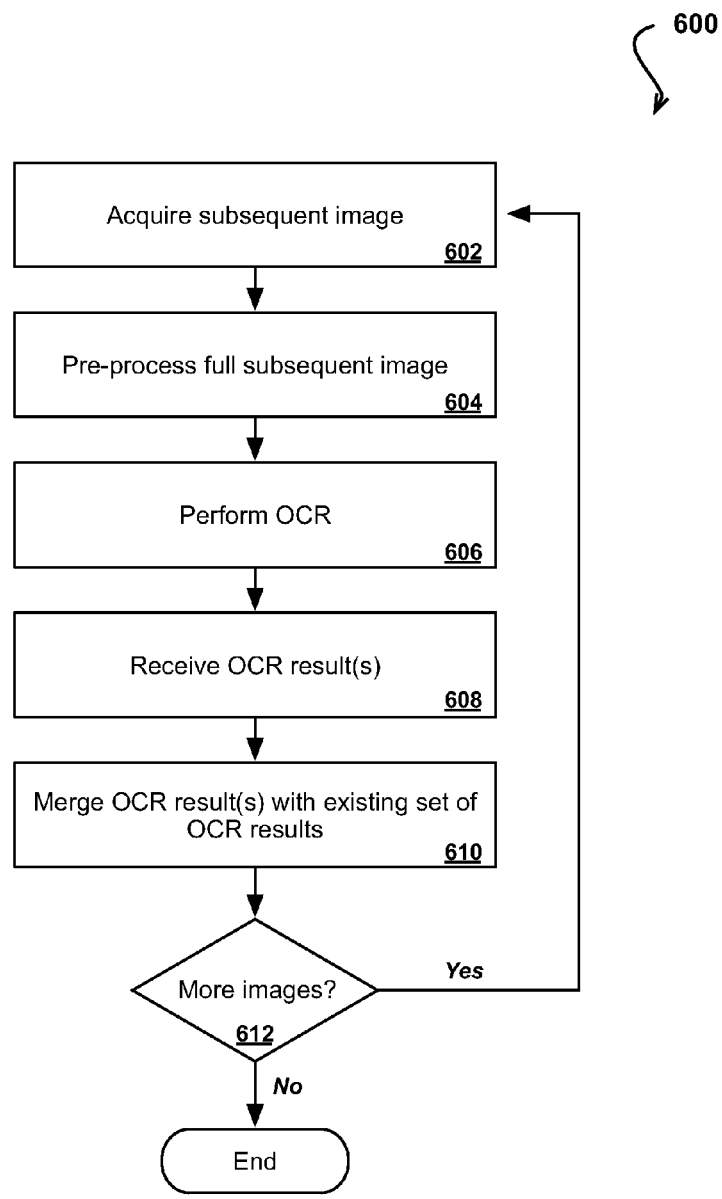
FIG. 6 illustrates steps of an example process for merging respective OCR results from a subsequent image with preexisting OCR results from a previously captured image that can be used in accordance with some embodiments of the subject technology.

FIG. 6 illustrates steps of an example process 600 for merging respective OCR results from a subsequent image with preexisting OCR results from a previously acquired image that can be used in accordance with some embodiments of the subject technology. In some embodiments, the process 600 may be implemented by one or more computing devices or systems (e.g., a mobile computing device). A mobile computing device may execute the process 600 conjunctively with the process 500 described in FIG. 5 in some examples. For instance, the process 600 may be executed by the mobile computing device after step 520 in FIG. 5.

At step 602, a subsequent image is acquired via the camera of the mobile computing device. For example, the subsequent image is a respective image that is subsequently captured from an earlier captured image (e.g., the image described by reference to FIG. 5) in a session in which multiple images are captured over a span of time (e.g., three or more images captured no more than 500 ms apart).

At step 604, a set of pre-processing operations is performed on an entirety of the subsequent image for preparing the subsequent image for OCR. As mentioned before, such pre-processing operations may include, but are not limited to, detecting a set of glyphs in the image, removing one or more non-text features in the image, and performing binarization of the image by changing the image to only include black and white colors, etc. It is appreciated that an amount of time for performing pre-processing operations on the entirety of the subsequent image could take a longer amount of time to complete than the aforementioned pre-processing operations for only the overlapping text regions of a previous image captured in a multi-image session in the manner as described before.

At step 606, OCR is performed on the subsequent image. As mentioned before, the OCR may be performed remotely (e.g., at a server) or locally on the mobile computing device. In one example, the OCR identifies or recognizes the detected set of glyphs (from one or more pre-processing operations) with a respective set of characters. It is appreciated that different techniques for performing OCR may be implemented and still be within the scope of the subject technology.

At step 608, a set of OCR results from the OCR performed on the subsequent image is received. At step 610, the pre-existing set of OCR results from the earlier acquired image(s) and the set of OCR results are merged into a third set of OCR results. In some embodiments, merging the results may be accomplished by determining a subset of OCR results from among the set of OCR results from the subsequent image that is new or different than the set of preexisting OCR results and then merging the subset of OCR results and the set of preexisting OCR results. In other examples, a subset of OCR results from among the set of OCR results from the subsequent image may replace one or more OCR results from among the pre-existing set of OCR results. For instance, each OCR result may include a respective confidence score indicating a relative accuracy of the OCR result. A respective OCR result that has a lower confidence than a respective confidence score of an OCR result from the subsequent image may be replaced in the merged set of OCR results. The merged set of OCR results may then be provided for display by the mobile computing device.

At step 612, a determination is made whether there are any more images (e.g., at least one more subsequently captured image) to process in the session in which multiple images are captured over the span of time. If so, the process 600 continues to step 602 and repeats the following steps on another image. Alternatively, the process 600 then ends.

Figures 7A, 7B:
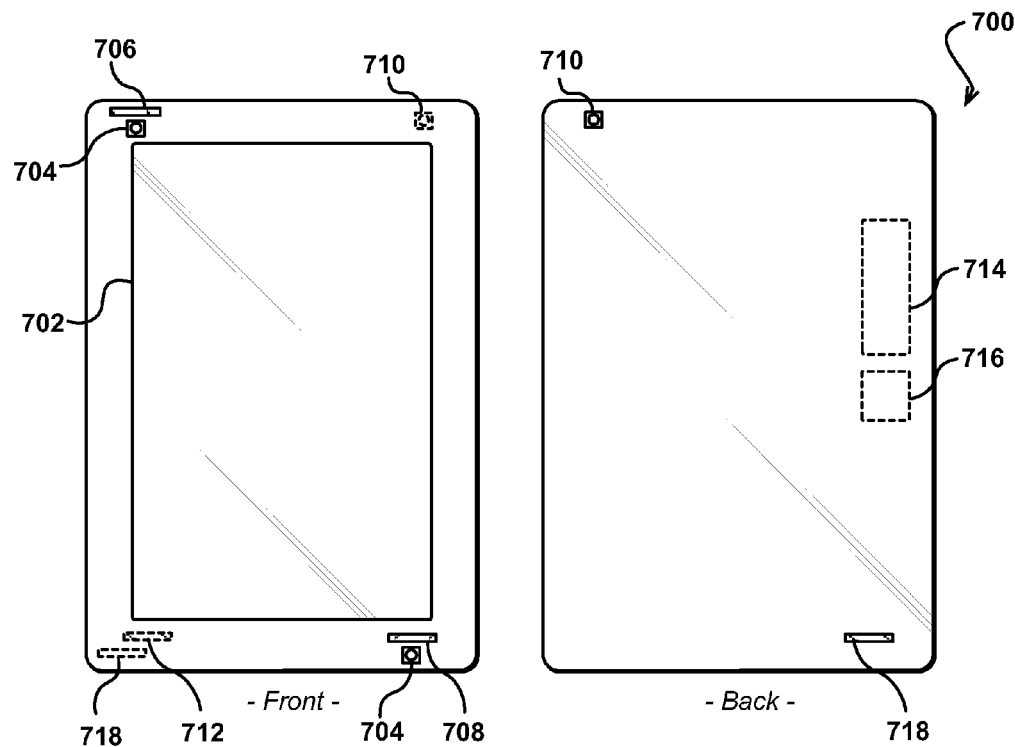
FIGS. 7A and 7B illustrate front and back views, respectively, of an example electronic computing device that can be used in accordance with various embodiments.

FIGS. 7A and 7B illustrate front and back views, respectively, of an example electronic computing device 700 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 700 has a display screen 702 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 704 on the front of the device and at least one image capture element 710 on the back of the device. It should be understood, however, that image capture elements could also, or alternatively, be placed on the sides or corners of the device, and that there can be any appropriate number of capture elements of similar or different types. Each image capture element 704 and 710 may be, for example, a camera, a charge-coupled device (CCD), a motion detection sensor or an infrared sensor, or other image capturing technology.

As discussed, the device can use the images (e.g., still or video) captured from the imaging elements 704 and 710 to generate a three-dimensional simulation of the surrounding environment (e.g., a virtual reality of the surrounding environment for display on the display element of the device). Further, the device can utilize outputs from at least one of the image capture elements 704 and 710 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 708 on the front side, one microphone 712 on the back, and one microphone 706 on or near a top or side of the device. In some devices there may be only one microphone, while in other devices there might be at least one microphone on each side and/or corner of the device, or in other appropriate locations.

The device 700 in this example also includes one or more orientation- or position-determining elements 718 operable to provide information such as a position, direction, motion, or orientation of the device. These elements can include, for example, accelerometers, inertial sensors, electronic gyroscopes, and electronic compasses.

The example device also includes at least one computing mechanism 714, such as may include at least one wired or wireless component operable to communicate with one or more electronic devices. The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

Figure 8:
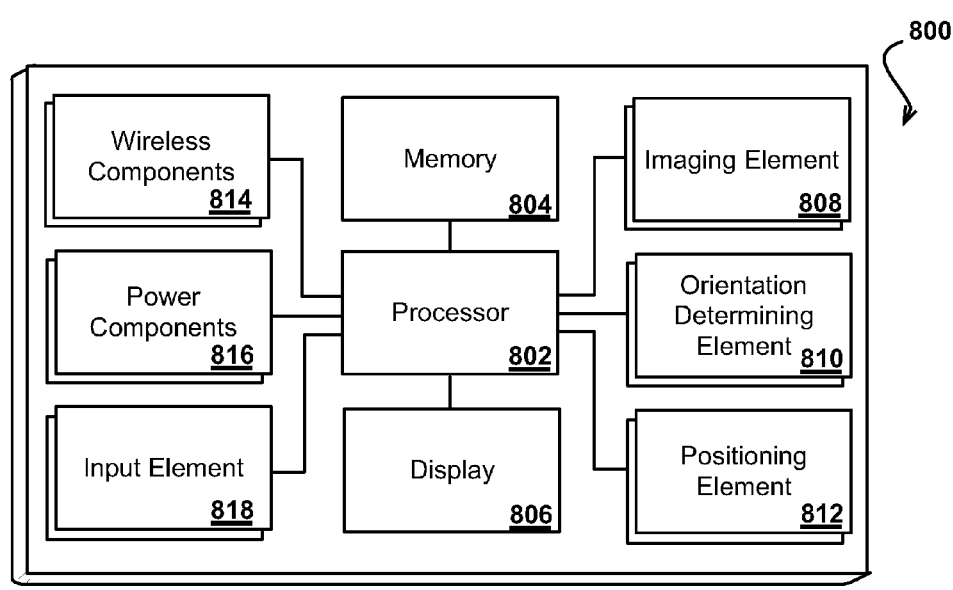
FIG. 8 illustrates a set of basic components of an electronic computing device such as the device described with respect to FIGS. 7A and 7B.

FIG. 8 illustrates a set of basic components of an electronic computing device 800 such as the device 700 described with respect to FIGS. 7A and 7B. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of computing approaches can be available for sharing with other devices.

The device typically will include some type of display element 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least one positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 9:
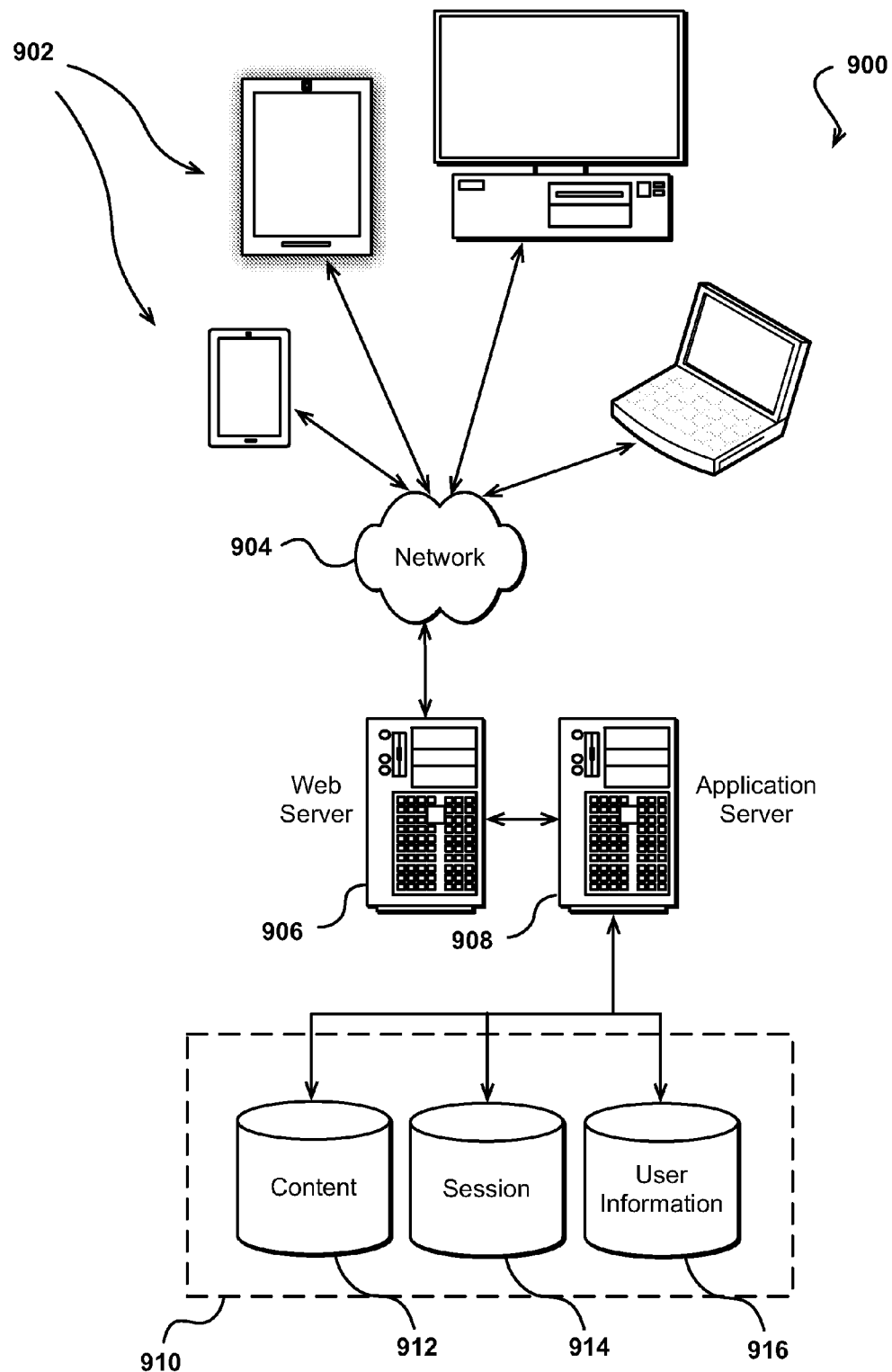
FIG. 9 illustrates an example of an environment for implementing aspects in accordance with various embodiments of the subject technology.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Computing over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via computing links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method comprising:
   acquiring an image via a camera of a mobile computing device;
   displaying a representation of the image in a user interface of the mobile computing device;
   determining a viewing mode of the mobile computing device;
   displaying graphical elements in the user interface, the graphical elements overlapping a portion of the representation of the image;
   determining positions of the graphical elements in the user interface;
   determining, using the positions, an area of the representation that is not overlapped by graphical elements;
   determining a portion of the image corresponding to the area of the representation;
   identifying at least one region of text within the portion; and
   performing a pre-processing operation on the at least one region of text to prepare the image for optical character recognition.

2. The computer-implemented method of claim 1, further comprising:
   providing OCR results for the at least one region of text for display on the mobile computing device.

3. The computer-implemented method of claim 1, further comprising:
   adjusting a size of the at least one region of text.

4. The computer-implemented method of claim 1, wherein the pre-processing operation comprises at least one of detecting a set of glyphs in the at least one region of text, removing one or more non-text features in the at least one region of text, and performing binarization of the at least one region of text.

5. The computer-implemented method of claim 2, further comprising:
   receiving second OCR results from OCR performed on an acquired second image;
   merging the OCR results and the second OCR results into third OCR results; and
   providing the third OCR results for display on the mobile computing device.

6. The computer-implemented method of claim 1, further comprising determining the area of the representation based at least on a language of a user.

7. A system comprising:
   a display;
   a processor; and
   a memory device including instructions that, when executed by the processor, cause the processor to perform a set of operations comprising:
   acquiring an image by the system;
   displaying a representation of the image on the display;

displaying a graphical element on the display, the graphical element overlapping the representation;

determining an area of the representation that is not overlapped by the graphical element, wherein the area includes a center portion of the representation;

determining a portion of the image corresponding to the area of the representation;

determining at least one text region that at least partially overlaps with the portion; and performing a pre-processing operation on the at least one text region before performing at least one recognition process.

8. The system of claim 7, wherein the pre-processing operation comprises at least one of removing one or more non-text features in the at least one text region, and performing binarization of the at least one text region by changing the at least one text region to only include black and white colors.

9. The system of claim 7, wherein the at least one recognition process comprises optical character recognition.

10. The system of claim 7, wherein:
determining an area of the representation is based at least on a viewing mode of the system, the viewing mode of the system comprising either a portrait viewing mode or a landscape viewing mode, and the area comprises at least a first set of distances away from a top border or a bottom border of the representation when the viewing mode is in the portrait viewing mode, and the area comprises at least a second set of distances away from a left border or a right border when the viewing mode is in the landscape viewing mode.

11. The system of claim 7, wherein:
determining an area of the representation is based at least on a position of the graphical element.

12. The system of claim 7, further comprising determining the area of the representation is based at least on a language of a user.

13. The system of claim 7, further comprising determining the area of the representation is based at least on a set of distances away from at least one of a top border, bottom border, left border and right border of the representation.

14. The system of claim 7, wherein the memory device includes further instructions that, when executed by the processor, cause the processor to perform a further set of operations comprising:
providing OCR results for the at least one text region for display on the display.

15. The system of claim 7, wherein the memory device includes further instructions that, when executed by the processor, cause the processor to perform a further set of operations comprising:
adjusting a size of the at least one text region.

16. The system of claim 15, wherein adjusting a size of the at least one text region comprises:
resizing the size of the at least one text region to match a height or width of a respective size of the area of the representation.

17. The system of claim 14, wherein the memory device includes further instructions that, when executed by the processor, cause the processor to perform a further set of operations comprising:
receiving second OCR results from OCR performed on an acquired second image;
merging the OCR results and the second OCR results into third OCR results; and
providing the third OCR results for display on the system.

18. A non-transitory computer-readable medium including instructions stored therein that, when executed by at least one computing device, cause the at least one computing device to perform a set of operations comprising:
acquiring an image by the at least one computing device;
displaying a representation of the image in a display of the at least one computing device;
displaying a graphical element on the display, the graphical element overlapping the representation;
region of the determining an area of the representation that is not overlapped by the graphical element, wherein the area includes a center portion of the representation;
determining a portion of the image corresponding to the area of the representation
determining at least one text region that at least partially overlaps with the portion; and
performing a pre-processing operation on the at least one text region before performing at least one recognition process.

19. The non-transitory computer-readable medium of claim 18, wherein the non-transitory computer-readable medium includes further instructions stored therein that, when executed by the at least one computing device, cause the at least one computing device to perform a further set of operations comprising:
providing OCR results for the at least one text region for display on the at least one computing device.

20. The non-transitory computer-readable medium of claim 19, wherein the image region after the set of operations comprising:
receiving second OCR results from OCR performed on an acquired second image;
merging the OCR results and the second OCR results into third OCR results; and
providing the third OCR results for display on the least one computing device.

* * * * *